US012528352B2

(12) United States Patent
Daba et al.

(10) Patent No.: US 12,528,352 B2
(45) Date of Patent: Jan. 20, 2026

(54) VEHICLE DISPLAY DEVICE, VEHICLE DISPLAY METHOD, AND NON-TRANSITORY STORAGE MEDIUM

(71) Applicant: TOYOTA JIDOSHA KABUSHIKI KAISHA, Toyota (JP)

(72) Inventors: Hiroaki Daba, Nisshin (JP); Miki Tsujino, Nagakute (JP); Masashi Hatanaka, Toyota (JP); Makoto Konishi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 18/426,626

(22) Filed: Jan. 30, 2024

(65) Prior Publication Data

US 2024/0262200 A1 Aug. 8, 2024

(30) Foreign Application Priority Data

Feb. 8, 2023 (JP) .................................. 2023-017947

(51) Int. Cl.
*B60K 35/28* (2024.01)
*B60K 35/22* (2024.01)
(52) U.S. Cl.
CPC .............. *B60K 35/28* (2024.01); *B60K 35/22* (2024.01); *B60K 2360/119* (2024.01); *B60K 2360/161* (2024.01); *B60K 2360/175* (2024.01); *B60K 2360/1868* (2024.01); *B60Y 2302/03* (2013.01); *B60Y 2400/92* (2013.01)

(58) Field of Classification Search
CPC .................... B60K 35/28; B60K 35/22; B60K 2360/1868; B60K 2360/161; B60K 2360/119; B60K 2360/175; B60Y 2302/03; B60Y 2400/92
See application file for complete search history.

(56) References Cited

U.S. PATENT DOCUMENTS

| 2005/0071082 | A1* | 3/2005 | Ohmura | G01C 21/365 340/995.19 |
| 2013/0289875 | A1* | 10/2013 | Kumon | G01C 21/365 701/533 |
| 2018/0173237 | A1* | 6/2018 | Reiley | G05D 1/0061 |
| 2018/0301029 | A1* | 10/2018 | Nilsson | G06V 20/58 |
| 2021/0104212 | A1* | 4/2021 | Horihata | B60R 16/02 |
| 2021/0261149 | A1 | 8/2021 | Doi | |
| 2023/0147535 | A1* | 5/2023 | Terazawa | G01C 21/30 |
| 2023/0311656 | A1* | 10/2023 | Yasui | B60K 35/29 701/36 |

(Continued)

FOREIGN PATENT DOCUMENTS

| CN | 117465340 A | * | 1/2024 | ............ B60Q 5/006 |
| CN | 118457228 A | * | 8/2024 | ............ B60W 50/14 |
| JP | 2002-163785 A | | 6/2002 | |

(Continued)

*Primary Examiner* — Chico A Foxx
(74) *Attorney, Agent, or Firm* — Oliff PLC

(57) ABSTRACT

A vehicle display device includes a processor, the processor being configured to acquire a deceleration state of a vehicle achieved by driver assistance and a reason for decelerating the vehicle, and cause a display to display a deceleration image indicating that the vehicle is decelerating and a reason image indicating the reason, based on the acquired deceleration state and the acquired reason.

7 Claims, 6 Drawing Sheets

(56) References Cited

U.S. PATENT DOCUMENTS

2024/0042972 A1* 2/2024 Kim .................. B60T 17/22
2024/0174245 A1* 5/2024 Doi .................. B60W 50/087

FOREIGN PATENT DOCUMENTS

| JP | 2006284195 A | * | 10/2006 |
| JP | 2017-214021 A | | 12/2017 |
| JP | 2018-045273 A | | 3/2018 |
| JP | 2021-133777 A | | 9/2021 |

\* cited by examiner

FIG. 4
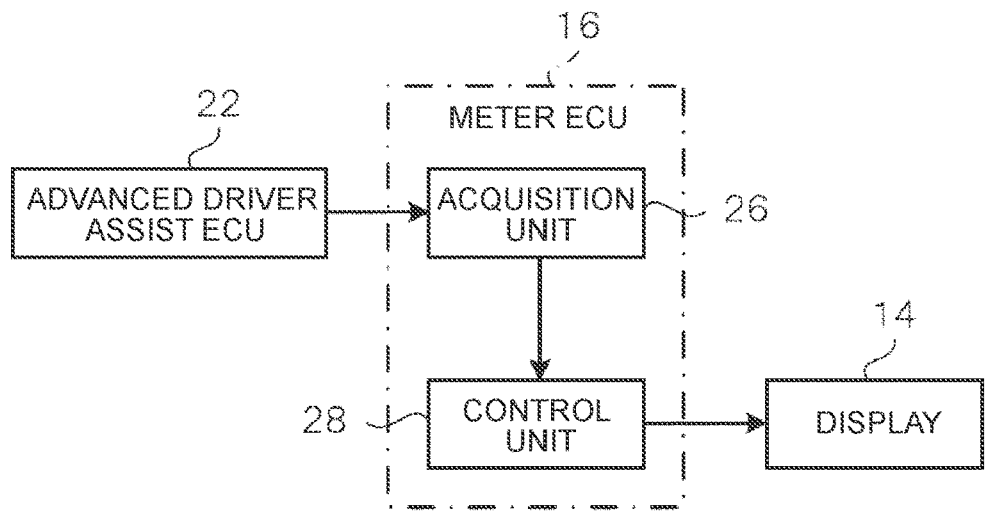
FIG. 5
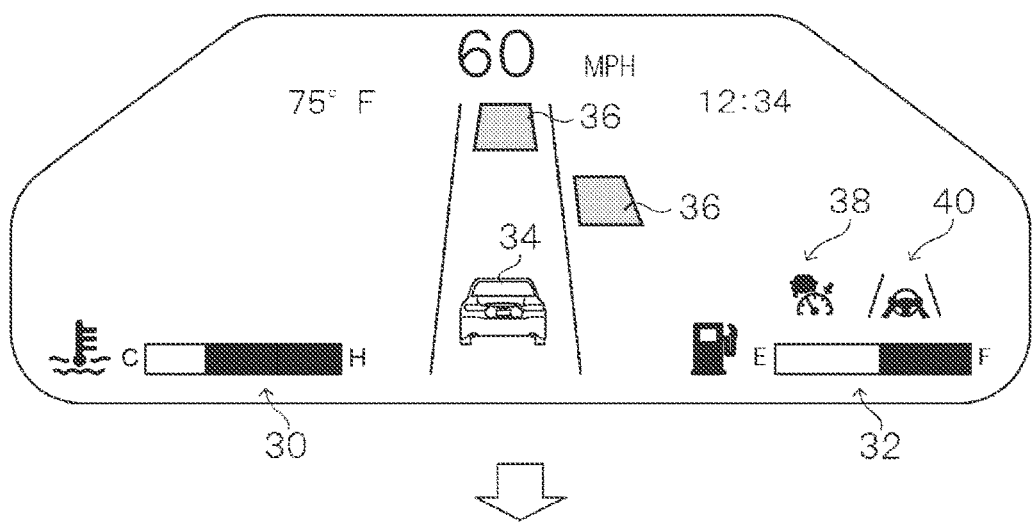
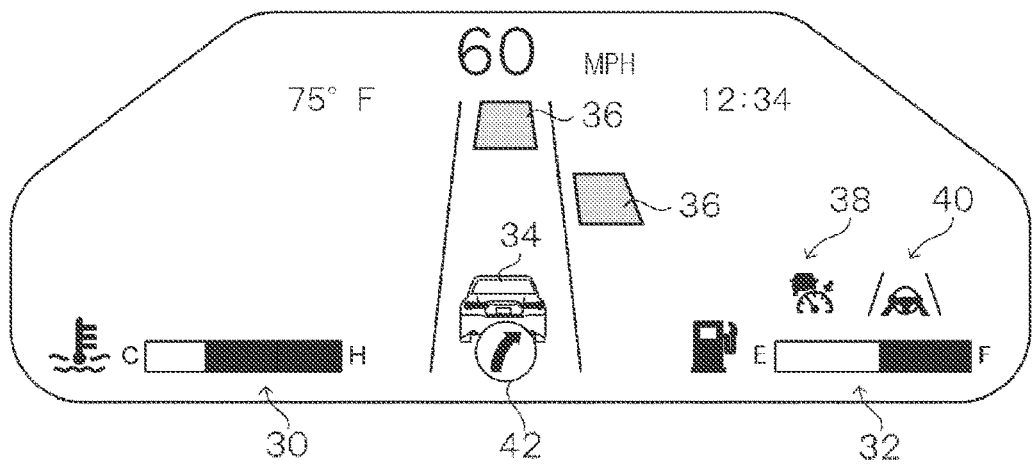

FIG. 6
| REASON IMAGE | REASON FOR DECELERATION |
|---|---|
| 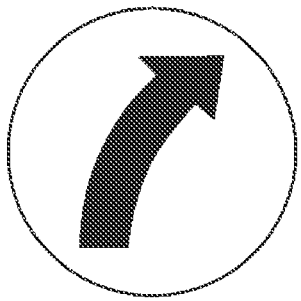 | CORNER (RIGHT CORNER) |
| 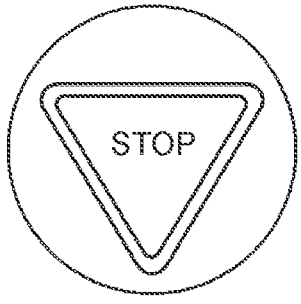 | STOP |
| 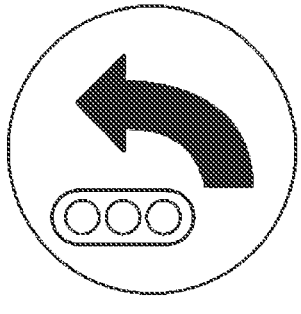 | RIGHT OR LEFT TURN AT INTERSECTION (LEFT TURN) |
| 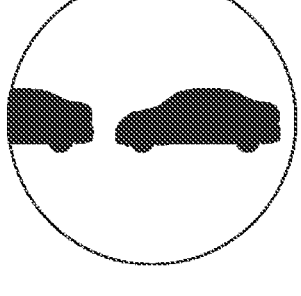 | PRECEDING VEHICLE |

VEHICLE DISPLAY DEVICE, VEHICLE DISPLAY METHOD, AND NON-TRANSITORY STORAGE MEDIUM

CROSS-REFERENCE TO RELATED APPLICATION

This application claims priority to Japanese Patent Application No. 2023-017947 filed on Feb. 8, 2023, incorporated herein by reference in its entirety.

BACKGROUND

1. Technical Field

The present disclosure relates to vehicle display devices, vehicle display methods, and non-transitory storage media.

2. Description of Related Art

Japanese Unexamined Patent Application Publication No. 2017-214021 (JP 2017-214021 A) discloses a driver assist device. This driver assist device includes: a reception unit configured to receive traffic information; an acquisition unit configured to acquire occupant information on an occupant in a vehicle; a determination unit configured to determine, based on the traffic information received while the vehicle is traveling, whether the vehicle needs to be decelerated; a setting unit configured to, when it is determined that the vehicle needs to be decelerated, set a timing of deceleration according to the occupant information acquired by the acquisition unit; and a notification unit configured to notify the timing of deceleration set by the setting unit.

SUMMARY

In the technique disclosed in JP 2017-214021 A, the occupant can know the timing of deceleration that is performed by driver assistance, but cannot know the reason for the deceleration. Therefore, this technique has room for improvement.

The present disclosure provides a vehicle display device, vehicle display method, and non-transitory storage medium that allow an occupant to recognize the reason for deceleration performed by driver assistance and the deceleration state.

A vehicle display device according to a first aspect includes a processor. The vehicle display device comprising a processor, the processor being configured to acquire a deceleration state of a vehicle achieved by driver assistance and a reason for decelerating the vehicle, and cause a display to display a deceleration image indicating that the vehicle is decelerating and a reason image indicating the reason, based on the acquired deceleration state and the acquired reason.

According to the first aspect, the deceleration state achieved by the driver assistance can be recognized from the deceleration image, and the reason for the deceleration can be recognized from the reason image.

In the vehicle display device according to the above aspect, the processor may be configured to cause the display to display, as the reason image, an image of an enclosed icon indicating the reason.

According to the above aspect, the reason for the deceleration can be displayed in an easy-to-understand manner using the icon. Therefore, the reason for the deceleration can be easily recognized.

In the vehicle display device according to the above aspect, the processor may be configured to further cause the display to display a vehicle image representing the vehicle and cause the display to display, as the reason image, an image of an enclosed icon indicating the reason over or under the vehicle image.

According to the above aspect, the image of the enclosed icon is displayed as the reason image over or under the vehicle image. Therefore, the reason for the deceleration can be intuitively recognized.

In the vehicle display device according to the above aspect, the processor may be configured to, when the reason is a right or left turn at an intersection or a corner, cause the display to display the reason image including an image indicating a direction of travel.

According to the above aspect, when the reason for the deceleration is an intersection or a corner, not only the reason for the deceleration but also the direction of travel can be recognized from the reason image including the image indicating the direction of travel.

In the vehicle display device according to the above aspect, the processor may be configured to cause the display to display, as the deceleration image, a vehicle image with a brake light of the vehicle turned on.

According to the above aspect, it can be recognized from the vehicle image with the brake light turned on that the vehicle is decelerating.

A vehicle display method according to a second aspect includes acquiring a deceleration state of a vehicle achieved by driver assistance and a reason for decelerating the vehicle; and displaying a deceleration image indicating that the vehicle is decelerating and a reason image indicating the reason, based on the acquired deceleration state and the acquired reason.

According to the second aspect, the vehicle display method can be provided that makes it possible to recognize the deceleration state achieved by the driver assistance from the deceleration image and to recognize the reason for the deceleration from the reason image.

A non-transitory storage medium according to a third aspect is a non-transitory storage medium storing instructions that are executable by one or more processors and that cause the one or more processors to perform functions. The functions include: acquiring a deceleration state of a vehicle achieved by driver assistance and a reason for decelerating the vehicle; and displaying a deceleration image indicating that the vehicle is decelerating and a reason image indicating the reason, based on the acquired deceleration state and the acquired reason.

According to the third aspect, the non-transitory storage medium can be provided that makes it possible to recognize the deceleration state achieved by the driver assistance from the deceleration image and to recognize the reason for the deceleration from the reason image.

As described above, according to the present disclosure, it is possible to provide the vehicle display device, vehicle display method, and non-transitory storage medium that allow an occupant to recognize the reason for deceleration performed by driver assistance and the deceleration state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a functional block diagram showing the functional configurations of the meter ECU;

FIG. 5 illustrates display control on a display;

FIG. 6 shows an example of reason images corresponding to reasons for deceleration;

DETAILED DESCRIPTION OF EMBODIMENTS

Figure 1:
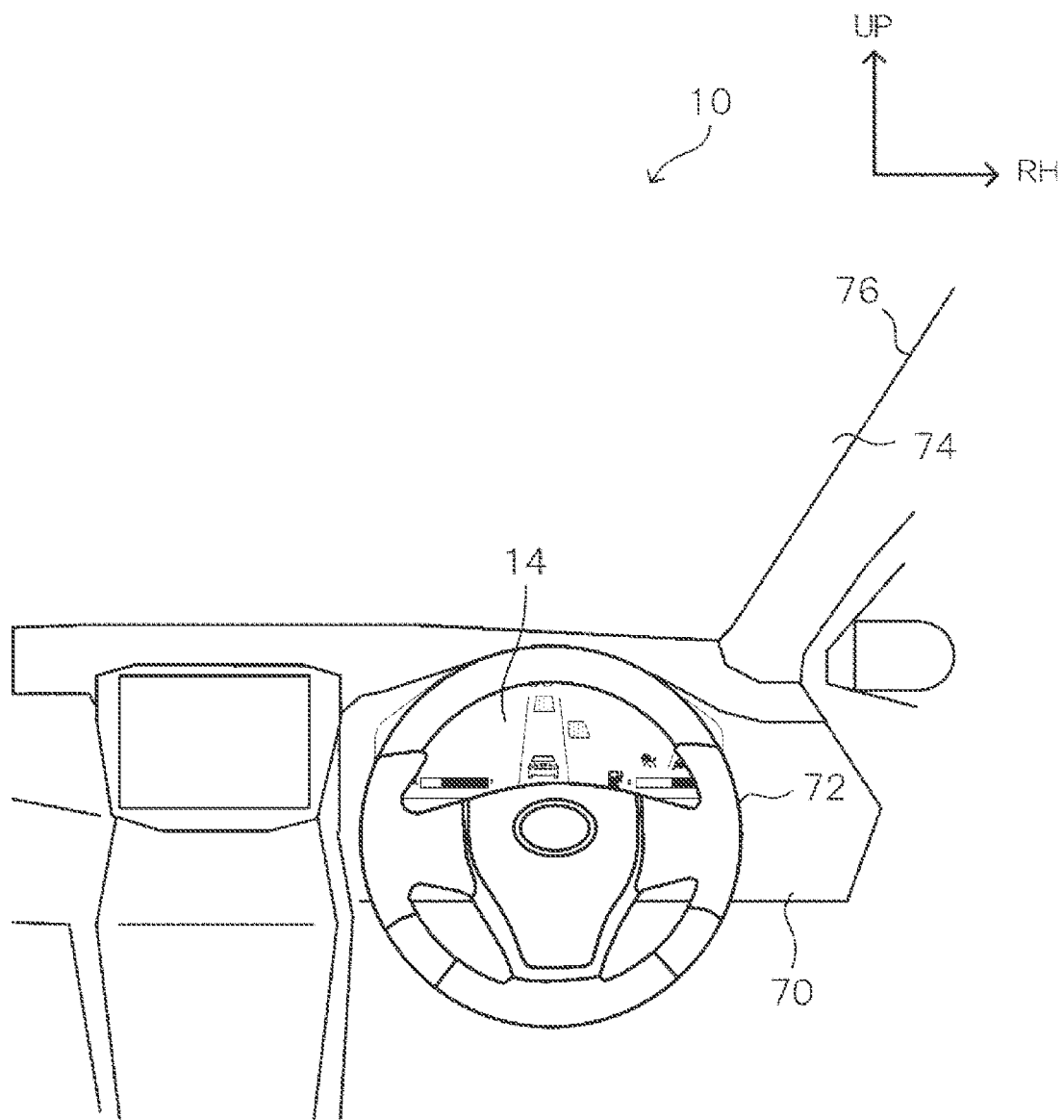
FIG. 1 schematically shows a vehicle display device according to an embodiment.

Hereinafter, an example of an embodiment of the present disclosure will be described in detail with reference to the drawings. FIG. 1 schematically shows a vehicle display device according to the present embodiment. In FIG. 1, the arrow UP indicates the upper side in the vehicle vertical direction, and the arrow RH indicates the right side in the vehicle lateral direction. In the following description, the upper and lower sides and the right and left sides mean the upper and lower sides in the vehicle vertical direction and the right and left sides in the vehicle lateral direction, respectively.

As shown in FIG. 1, an instrument panel 70 is installed in the front part of a vehicle cabin of a vehicle 10. A windshield glass 74 is installed at the front end of the instrument panel 70. The windshield glass 74 extends in the vehicle vertical direction and the vehicle lateral direction and separates the inside and outside of the vehicle cabin.

The right end in the vehicle lateral direction of the windshield glass 74 is fixed to a right front pillar 76 in the vehicle lateral direction. The front pillar 76 extends in the vehicle vertical direction, and the windshield glass 74 is fixed to the inner end in the vehicle lateral direction of the front pillar 76. The left end in the vehicle lateral direction of the windshield glass 74 is fixed to a left front pillar, not shown, in the vehicle lateral direction.

The instrument panel 70 extends in the vehicle lateral direction, and a steering wheel 72 is installed on the right side in the vehicle lateral direction of the instrument panel 70. According to the present embodiment, as an example, the vehicle is therefore a right-hand drive vehicle with the steering wheel 72 on the right side, and a driver's seat is on the right side of the vehicle 10.

A display 14 of the vehicle display device is installed on the instrument panel 70 at a position in front of the steering wheel 72. As an example, the display 14 is a liquid crystal panel, and is configured to display the traveling state of the vehicle 10, the operating state of a driver assist device, etc.

Figure 2:
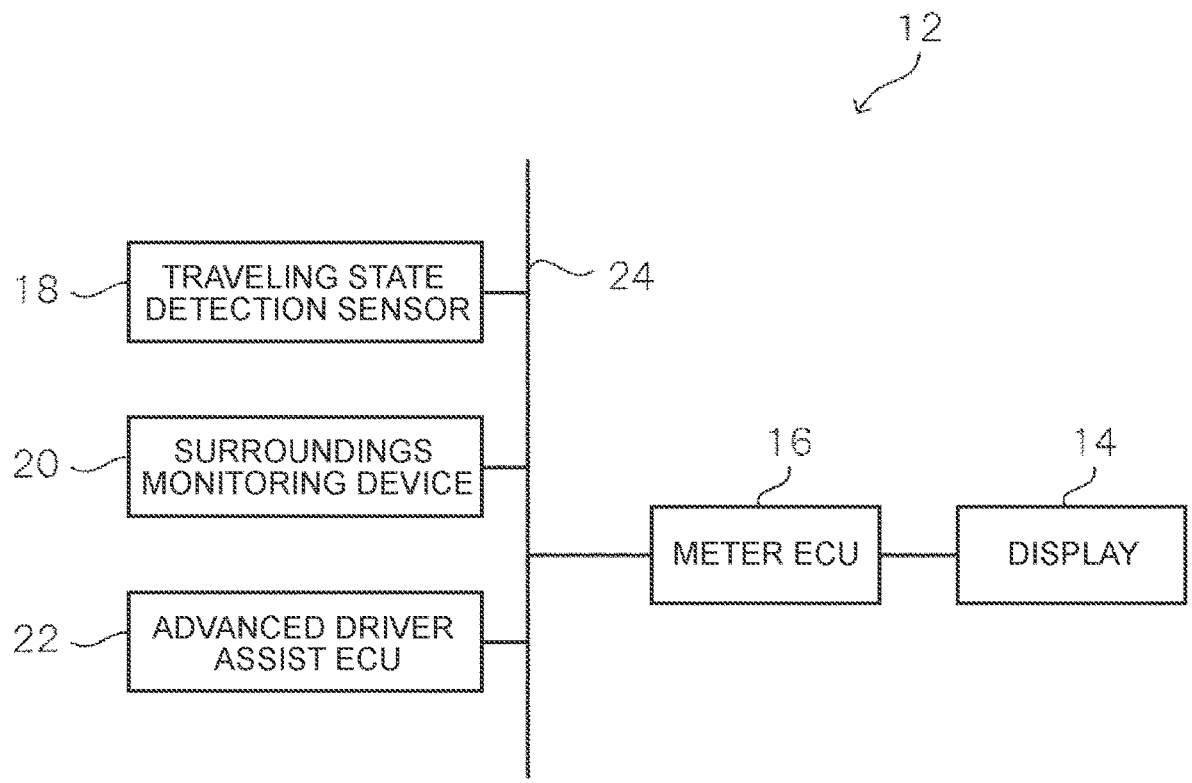
FIG. 2 is a block diagram showing the configuration of a control system of the vehicle display device according to the embodiment.

Next, the configuration of a control system of the vehicle display device 12 according to the present embodiment will be described. FIG. 2 is a block diagram showing the configuration of the control system of the vehicle display device 12 according to the present embodiment.

The vehicle display device 12 according to the present embodiment includes a meter electronic control unit (ECU) 16, a traveling state detection sensor 18, a surroundings monitoring device 20, and an advanced driver assist ECU 22. These components are connected to a vehicle network 24.

The display 14 is connected to the meter ECU 16. The meter ECU 16 controls the display 14 to perform a process of displaying a plurality of meters, a process of displaying various types of vehicle information, etc. When an abnormality etc. occurs in the vehicle 10, the meter ECU 16 notifies an occupant by displaying the occurrence of the abnormality on the display 14. Examples of the various types of vehicle information to be displayed on the display 14 include the operating state of the driver assist device etc. The display mode of the display 14 can be switched using a switch, not shown, etc., and can be changed to a display mode that matches the driver's preference.

The traveling state detection sensor 18 detects the traveling state of the vehicle 10. The traveling state detection sensor 18 includes, for example, at least one of various sensors such as a vehicle speed sensor, an acceleration sensor, a gyro sensor, an accelerator operation amount sensor, and a brake sensor.

The surroundings monitoring device 20 detects information indicating the surroundings of the vehicle 10. For example, the surroundings monitoring device 20 includes at least one of various devices such as a Global Positioning System (GPS) device, an in-vehicle communication device, a navigation system, a radar device, and a camera.

The advanced driver assist ECU 22 has functions to acquire surroundings information detected by the surroundings monitoring device 20 that monitors the surroundings, provide the surroundings information to other ECUs, and control steering and brakes as necessary. For example, the advanced driver assist ECU 22 performs a process of controlling the brakes to assist in deceleration when accelerator-off is detected by the traveling state detection sensor 18 and a preceding vehicle, an intersection, etc. is detected ahead of the vehicle 10 by the surroundings monitoring device 20. Specifically, the advanced driver assist ECU 22 controls functions such as a cruise control function to control acceleration and deceleration so that the vehicle 10 follows a preceding vehicle while responding to changes in vehicle speed of the preceding vehicle and a lane tracing assist function to warn of the possibility of deviation from the lane or course and assist in part of the steering wheel operation to avoid deviation from the lane or course.

Figure 3:
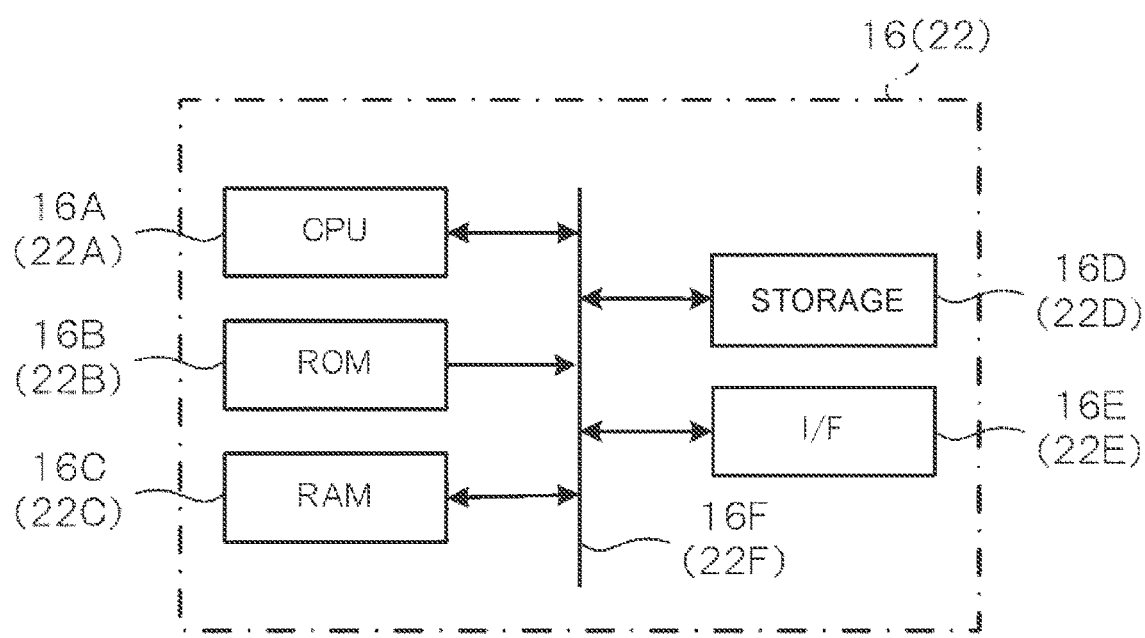
FIG. 3 is a block diagram showing the configuration of a main part of an electrical system of a meter electronic control unit (ECU) and an advanced driver assist ECU in the vehicle display device according to the embodiment.

FIG. 3 is a block diagram showing the configuration of a main part of an electrical system of the meter ECU 16 and the advanced driver assist ECU 22 in the vehicle display device 12 according to the present embodiment. Since the meter ECU 16 and the advanced driver assist ECU 22 are basically configured as a common computer, the meter ECU 16 will be representatively described.

The meter ECU 16 is a common microcomputer including a central processing unit (CPU) 16A, a read-only memory (ROM) 16B, a random access memory (RAM) 16C, a storage 16D, an interface (I/F) 16E, and a bus 16F.

The CPU 16A is a central processing unit and controls the overall operation of the device by executing various programs. The ROM 16B stores in advance various control programs such as a vehicle display program, various parameters, etc. The RAM 16C is used as a work area etc. when the CPU 16A executes the various programs. The storage 16D is composed of various storage units such as a hard disk drive (HDD), a solid state drive (SSD), and a flash memory, and stores various types of data, application programs, etc. The I/F 16E can be connected to the vehicle network 24, and sends and receives various types of data to and from other ECUs connected to the vehicle network 24 such as the advanced driver assist ECU 22. The above components of the meter ECU 16 are electrically connected to each other via the bus 16F. In the present embodiment, the vehicle display program is described as being stored in the ROM 16B. However, the vehicle display program may be stored in the storage 16D.

Next, the functional configurations that function when the CPU 16A of the meter ECU 16 executes the programs stored in the ROM 16B will be described. FIG. 4 is a functional block diagram showing the functional configurations of the meter ECU 16.

As shown in FIG. 4, the meter ECU 16 has the functions of an acquisition unit 26 and a control unit 28 as the CPU 16A executes the programs stored in the ROM 16B.

The acquisition unit 26 acquires the deceleration state of the vehicle 10 achieved by driver assistance provided by the advanced driver assist ECU 22 and the reason for decelerating the vehicle 10.

Based on the results acquired by the acquisition unit 26, the control unit 28 displays a deceleration image indicating that the vehicle 10 is decelerating and a reason image indicating the reason for the deceleration. That is, the control unit 28 performs a process of displaying the deceleration image and the reason image on the display 14 based on the deceleration state and reason for the deceleration acquired by the acquisition unit 26.

Next, display control on the display 14 that is performed by the CPU 16A of the meter ECU 16 executing the programs stored in the ROM 16B will be described.

The meter ECU 16 performs control to display the detection results from the traveling state detection sensor 18, the detection results from the surroundings monitoring device 20, etc. on the display 14. The meter ECU 16 also performs control to display the state of assistance provided by the advanced driver assist ECU 22.

For example, as shown in FIG. 5, an image indicating the air temperature, vehicle speed, coolant temperature, remaining fuel level, etc. is displayed on the display 14 as an example of the detection results from the traveling state detection sensor 18, and information indicating other vehicles around the vehicle 10 etc. is displayed on the display 14 as an example of the detection results from the surroundings monitoring device 20. An image indicating the driver assistance function in operation etc. is also displayed. In the example of FIG. 5, the air temperature ("75° F." in FIG. 5) and the vehicle speed ("60 MPH" in FIG. 5) are displayed numerically. The coolant temperature and the remaining fuel level are displayed by a coolant temperature gauge image 30 indicating the coolant temperature and a fuel gauge image 32 indicating the remaining fuel level, respectively. Other vehicle images 36 indicating the presence of vehicles in front and to the side of the vehicle 10 are displayed together with a vehicle image 34 representing the vehicle 10. An icon 38 indicating that the cruise control function is in operation and an icon 40 indicating that the lane tracing assist function is in operation are also displayed.

In the vehicle 10 equipped with the vehicle display device 12 of the present embodiment, the advanced driver assist ECU 22 provides various types of driving assistance, and the brakes may be controlled by the driver assistance to decelerate the vehicle 10. In this case, the driver may not know the reason for the deceleration.

In the vehicle display device 12 of the present embodiment, when the advanced driver assist ECU 22 performs control to decelerate the vehicle 10, control is performed to display a deceleration image indicating that the vehicle 10 is decelerating and a reason image indicating the reason for the deceleration.

For example, when the advanced driver assist ECU 22 performs the process of controlling the brakes to assist in deceleration, the vehicle image 34 with brake lights turned on is displayed as a deceleration image, as shown in the lower part of FIG. 5. A reason image 42 indicating the reason for the deceleration is also displayed. The example of FIG. 5 shows the case where a corner is the reason for the deceleration.

Reasons for deceleration include, for example, a corner, a stop, a right or left turn at an intersection, and a preceding vehicle. For example, the reason images 42 corresponding to the reasons as shown in FIG. 6 are displayed. In the case of a corner and a right or left turn at an intersection, the direction of travel (arrow image) is also displayed. FIG. 6 shows an example of the reason images 42 corresponding to the reasons for deceleration. In the example of FIG. 6, the reason images 42 are images of circled icons.

Figure 7:
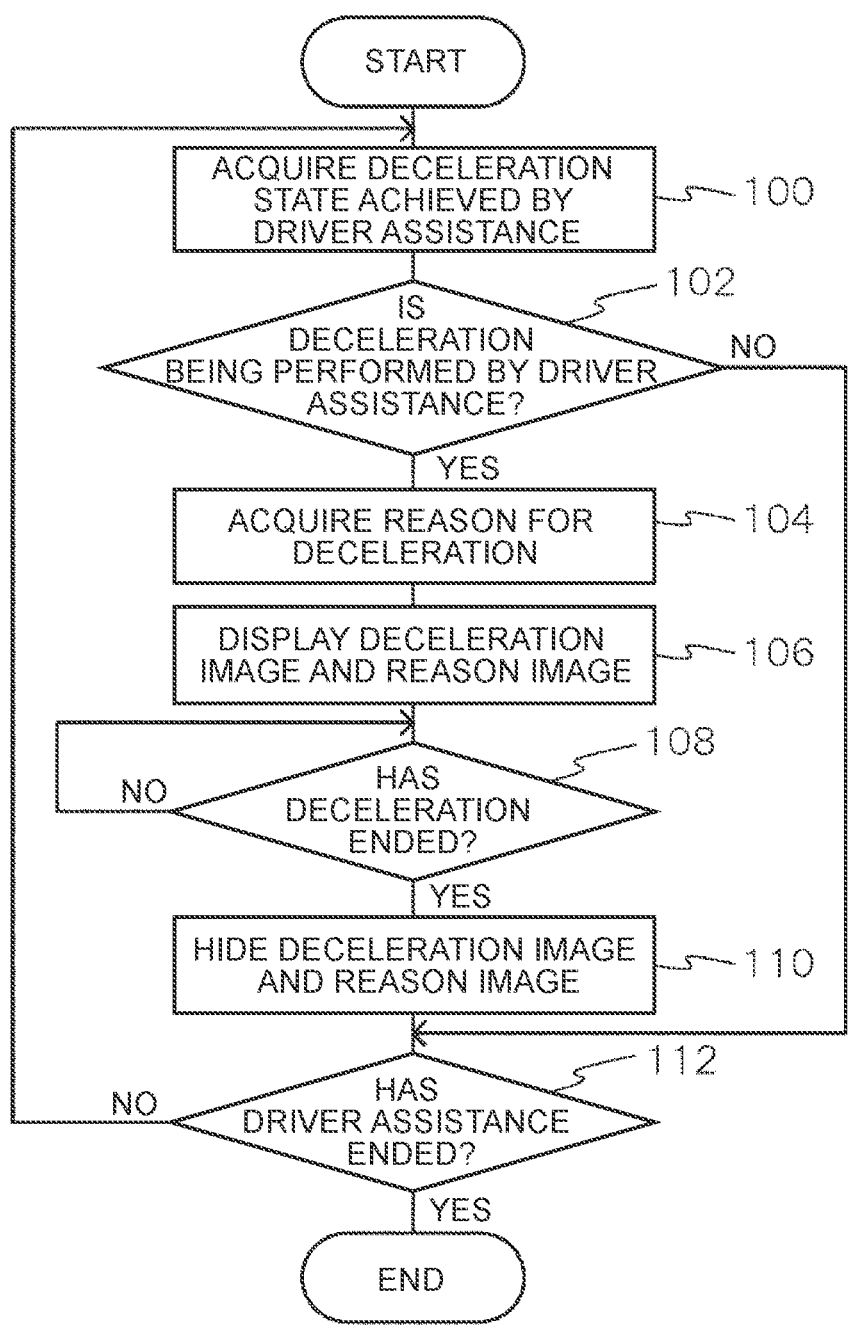
FIG. 7 is a flowchart showing an example of the flow of a process that is performed by the meter ECU of the vehicle display device according to the embodiment.

Next, a specific process that is performed by the meter ECU 16 of the vehicle display device 12 of the present embodiment configured as described above will be described. FIG. 7 is a flowchart showing an example of the flow of a process that is performed by the meter ECU 16 of the vehicle display device 12 according to the present embodiment. For example, the process of FIG. 7 is started when the advanced driver assist ECU 22 is instructed to start driver assistance involving brake control.

In step 100, the CPU 16A acquires the deceleration state achieved by the driver assistance, and the process proceeds to step 102. That is, the acquisition unit 26 acquires information indicating the control state regarding deceleration, etc. from the advanced driver assist ECU 22.

In step 102, the CPU 16A determines whether deceleration is being performed by the driver assistance. When Yes in step 102, the process proceeds to step 104. When No in step 102, the process proceeds to step 112.

In step 104, the CPU 16A acquires the reason for the deceleration, and the process proceeds to step 106. That is, the acquisition unit 26 acquires from the advanced driver assist ECU 22 the reason for performing the deceleration control by the driver assistance.

In step 106, the CPU 16A displays a deceleration image and a reason image 42 on the display 14, and the process proceeds to step 108. That is, the control unit 28 displays the vehicle image 34 as a deceleration image and the reason image 42 on the display 14. Since the vehicle image 34 is displayed as a deceleration image, it is possible to confirm that the vehicle 10 is decelerating by the driver assistance. Since the reason image 42 is displayed, it is also possible to confirm the reason for the deceleration. As shown in FIGS. 5 and 6, an image of a circled icon indicating the reason for the deceleration is displayed as the reason image 42, and this reason image 42 is displayed in a display area different from display areas for other functions. Therefore, the display intensity of the reason image 42 can be changed to allow the occupant to intuitively know that the reason image 42 is different from other similar functions. Since the reason image 42 is displayed immediately under the vehicle image 34, the reason for deceleration can be displayed in an easy-to-see manner.

In step 108, the CPU 16A determines whether the deceleration has ended. For example, in this determination, the control state of the advanced driver assist ECU 22 is checked to determine whether the deceleration has ended. The process waits until Yes in step S108, and then proceeds to step S110.

In step 110, the CPU 16A hides the deceleration image and the reason image 42, and the process proceeds to step 112.

In step 112, the CPU 16A determines whether the driver assistance has ended. This determination determines, for example, whether an instruction to end the driver assistance has been given. When No in step 112, the process returns to step 100 to repeat the above steps. When Yes in step 112, the series of steps of the meter ECU 16 ends.

As described above, in the vehicle display device 12 of the present embodiment, when deceleration is performed by driver assistance, the vehicle image 34 indicating that the vehicle 10 is decelerating is displayed as a deceleration image, and the reason image 42 indicating the reason for the deceleration is also displayed. Therefore, it is possible to confirm that the vehicle 10 is decelerating by the driver assistance and to confirm the reason for the deceleration.

In the present embodiment, an image of a circled icon is displayed as the reason image 42, so that the reason for deceleration can be displayed in an easy-to-understand manner.

Figure 8:
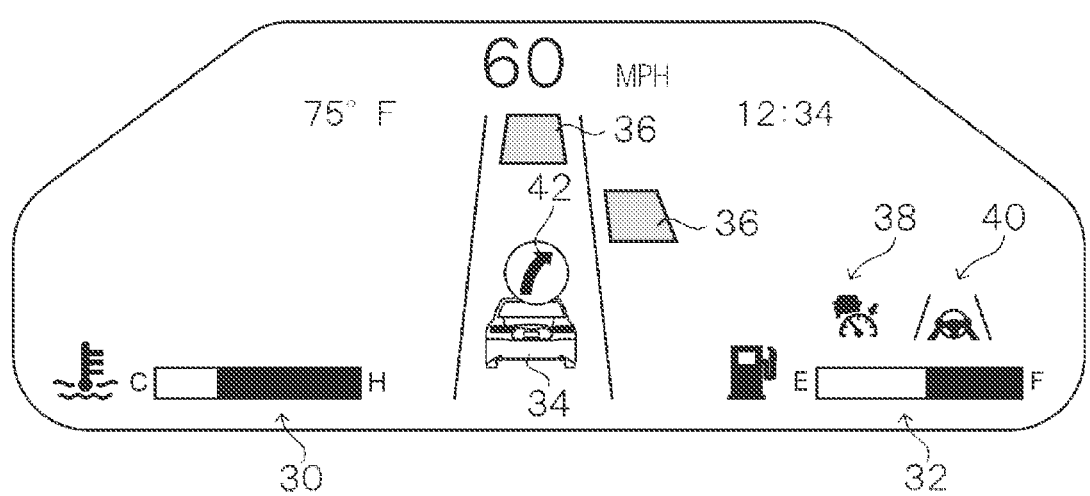
FIG. 8 shows an example in which a reason image is displayed over a vehicle image displayed as a deceleration image.

In the embodiment, the reason image 42 is displayed under the vehicle image 34 displayed as a deceleration image. However, the positional relationship between the reason image 42 and the vehicle image 34 is not limited to this. For example, as shown in FIG. 8, the reason image 42 may be displayed over the vehicle image 34 displayed as a deceleration image. Alternatively, the reason image 42 may be displayed to the side of the vehicle image 34.

Figure 9:
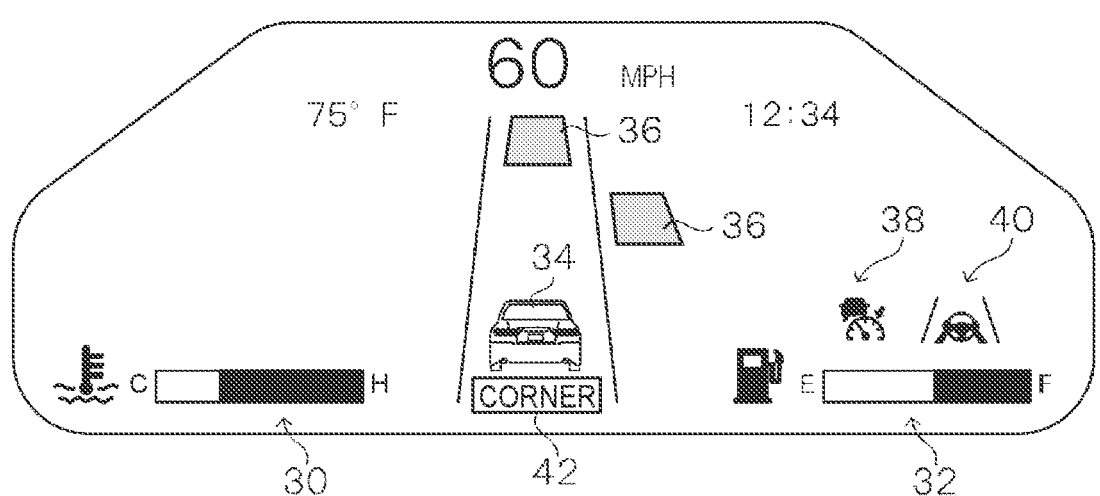
FIG. 9 shows an example in which a reason image indicating the reason for deceleration is displayed as a text image.

The above embodiment illustrates an example in which the reason image 42 is an image of a circled icon. However, the reason image 42 is not limited to this. For example, as shown in FIG. 9, an image of an icon containing text describing the reason for deceleration may be displayed as the reason image 42. Alternatively, icons in polygons such as a quadrilateral may be used instead of the circled icons.

In the above embodiment, the process that is performed by the meter ECU 16 of the vehicle display device 12 is described as a software process that is performed by executing the programs. However, the present disclosure is not limited to this. For example, the process may be performed by hardware such as a graphics processing unit (GPU), an application specific integrated circuit (ASIC), and a field-programmable gate array (FPGA). Alternatively, the process may be performed by a combination of both software and hardware. In the case of the software process, the programs may be stored in various storage media and distributed.

It should be understood that the present disclosure is not limited to the above and the present disclosure can be modified in various forms without departing from the spirit and scope of the present disclosure.

What is claimed is:

1. A vehicle display device comprising a processor, the processor being configured to
   acquire a deceleration state of a vehicle achieved by driver assistance and a reason for decelerating the vehicle, and
   cause a display to display a deceleration image indicating that the vehicle is decelerating and a reason image indicating the reason, based on the acquired deceleration state and the acquired reason, wherein
   the reason image is selected from a plurality of reason images corresponding to different reasons for deceleration, the displayed reason image corresponding to the acquired reason for decelerating the vehicle.

2. The vehicle display device according to claim 1, wherein the processor is configured to cause the display to display, as the reason image, an image of an enclosed icon indicating the reason.

3. The vehicle display device according to claim 1, wherein the processor is configured to further cause the display to display a vehicle image representing the vehicle and cause the display to display, as the reason image, an image of an enclosed icon indicating the reason over or under the vehicle image.

4. The vehicle display device according to claim 1, wherein the processor is configured to, when the reason is a right or left turn at an intersection or a corner, cause the display to display the reason image including an image indicating a direction of travel.

5. The vehicle display device according to claim 1, wherein the processor is configured to cause the display to display, as the deceleration image, a vehicle image with a brake light of the vehicle turned on.

6. A vehicle display method, comprising:
   acquiring a deceleration state of a vehicle achieved by driver assistance and a reason for decelerating the vehicle; and
   displaying a deceleration image indicating that the vehicle is decelerating and a reason image indicating the reason, based on the acquired deceleration state and the acquired reason, wherein
   the reason image is selected from a plurality of reason images corresponding to different reasons for deceleration, the displayed reason image corresponding to the acquired reason for decelerating the vehicle.

7. A non-transitory storage medium storing instructions that are executable by one or more processors and that cause the one or more processors to perform functions comprising:
   acquiring a deceleration state of a vehicle achieved by driver assistance and a reason for decelerating the vehicle; and
   displaying a deceleration image indicating that the vehicle is decelerating and a reason image indicating the reason, based on the acquired deceleration state and the acquired reason, wherein
   the reason image is selected from a plurality of reason images corresponding to different reasons for deceleration, the displayed reason image corresponding to the acquired reason for decelerating the vehicle.

* * * * *